United States Patent
Kikuchi et al.

[19]

[11] Patent Number: 5,803,487
[45] Date of Patent: Sep. 8, 1998

[54] AIR BAG APPARATUS FOR VEHICLE

[75] Inventors: Ryo Kikuchi, Yokohama; Satoru Yamaguchi, Hiroshima, both of Japan; Robert E. Scriven, Farmington Hills, Mich.; Hirohiko Kikuchi, Kumagaya, Japan

[73] Assignees: AlliedSignal Inc., Morristown, N.J.; Isuzu Motors Ltd., Kanagawa-ken; Kansei Corporation, Saitama-ken, both of Japan

[21] Appl. No.: 802,380

[22] Filed: Feb. 19, 1997

[51] Int. Cl.⁶ .................................................. B60R 21/16
[52] U.S. Cl. .......................... 280/728.2; 280/732
[58] Field of Search .............. 280/728.2, 728.3, 280/732

[56] References Cited

U.S. PATENT DOCUMENTS

| | | | |
|---|---|---|---|
| 5,275,432 | 1/1994 | Pray et al. | 280/728.2 |
| 5,303,951 | 4/1994 | Goestenkors et al. | 280/728.3 |
| 5,342,090 | 8/1994 | Sobczak et al. | 280/728.3 |
| 5,348,339 | 9/1994 | Turner | 280/728.3 |
| 5,474,323 | 12/1995 | Davidson | 280/728.2 |
| 5,482,313 | 1/1996 | Ikeya et al. | 280/728.3 |
| 5,527,063 | 6/1996 | Garner et al. | 280/728.2 |
| 5,556,126 | 9/1996 | Lee | 280/728.3 |

*Primary Examiner*—Paul N. Dickson
*Attorney, Agent, or Firm*—Markell Seitzman

[57] ABSTRACT

The invention has an object to improve easiness and certainty of the mounting operation of an air bag lid onto an opening of an instrument panel, and upon expanding operation of the air bag, increase the opening area of the air bag lid opening so as not to prevent expansion of the spreading air bag in the passenger compartment. A lid bracket 34 is connected to an air bag lid 15. The air bag lid 15 is secured through the lid bracket 34 to a panel bracket 32 provided on the back of the instrument panel 11 from the surface side of the instrument panel 11. Then, an air bag module body 12 is secured to the panel bracket 32 from the back side of the instrument panel 11. Further, collars 19 pierced with engagement holes 20 on the back thereof are provided on the air bag lid 15. Insertion spaces 36 for insertion of collars 19 and setup claws 37 for engagement in the engagement holes 20 of collars 19 inserted into the insertion spaces 36 are formed in the lid bracket 34.

14 Claims, 5 Drawing Sheets

5,803,487

AIR BAG APPARATUS FOR VEHICLE

BACKGROUND AND SUMMARY OF THE INVENTION

The present invention relates to an air bag apparatus for a vehicle which is used for protecting an occupant from an impact caused by a crash of the vehicle, or more particularly, to an air bag apparatus for a vehicle which is easily and accurately mounted to an instrument panel.

Passenger side air bag modules are generally known in the art. These modules are often mounted within an opening provided within an instrument panel. The module will often include an inflator for inflating an air bag and a lid, or deployment cover which is opened by the inflating air bag.

Japanese Unexamined Patent Publication No. 07-117,609 is representative of the prior art and is described below with reference to FIG. 6.

FIG. 6 shows an air bag module body 1 arranged and secured within a space under an instrument panel 2. The instrument panel includes an opening 3 through which an air bag 10 expands. This opening 3 is usually closed by a lid or cover 4, and upon expansion of the air bag 10, a thin portion or team seam 5 provided in the lid 4 is broken by the expanding force of the air bag 10, thus permitting the air bag 10 to inflate into the passenger compartment.

The structure for mounting the lid 4 onto the opening 3 of the instrument panel 2 is such that an engagement piece 7 having a long hole 6 and a claw 8 are provided on the back of the lid 4, and a hook member 9 engageable with the engagement piece 7 is fitted to the air bag module body 1.

When mounting the lid 4 having the structure as described above onto the opening 3 of the instrument panel 2, the lid 4 is pushed into the opening 3. This action forces the engagement piece 7 of the lid 4 over the hook member 9 while undergoing an elastic deformation. At the point when the hook member 9 and the long hole 6 are aligned with each other, the engagement piece 7 restores to its original shape, and the leading end of the hook member 9 is engaged within the long hole 6. Simultaneously, the claw 8 is caught by an inner edge of the opening 3, thus finalizing the position of the lid 4 relative to the instrument panel.

A deficiency in the above prior art structure is that after the completion of mounting of the lid 4 onto the opening 3, it is impossible to view the back side of the lid 4, thus making it impossible to visually confirm the certainty of engagement of the engagement piece 7 provided on the lid 4 with the hook member 9 provided in the air bag module body 1, resulting in the necessity of visual inspection of the state of engagement by going around to the back of the instrument panel which complicates the assembly operations.

The present invention was developed to resolve the deficiencies in the prior art and has a first object to improve the operational ease and accuracy of mounting of an air bag lid and an air bag module body by steps of: assembling a lid bracket to an air bag lid while visually checking the condition of assembly before mounting the air bag lid onto the opening of the instrument panel, inserting this subassembly of the air bag lid and the lid bracket into the opening of the instrument panel from the front surface side thereof, securing the same to a bracket provided on the back of the instrument panel, and further, securing the air bag module body to that bracket from the back side of the instrument panel.

A second object of the present invention is to permit simple assembly, with a sufficient strength, of the air bag lid and the lid bracket by engaging a setup claw provided on the lid bracket with an engagement hole in a collar which is formed as a projection, on the back of the air bag lid.

Accordingly, the invention comprises an air bag apparatus for a vehicle comprising an air bag module mounted to the underside of an instrument panel. The module includes an air bag which is inflated upon the detection of a crash of a vehicle. The module includes a cover which is broken by the air bag as it inflates toward the occupant into the passenger compartment. A lid or cover bracket is connected to the air bag cover; the air bag cover is fixed, via the lid or cover bracket, to a panel bracket provided on the back of the instrument panel from the back side of the instrument panel; and further, the air bag module body is secured to the panel bracket from the back side of the instrument panel.

The invention further comprises a collar having engagement holes therein. The collar is formed as a plurality of projections on the back of the air bag lid or cover, which are received in spaces formed in the lid bracket.

DETAILED DESCRIPTION OF THE DRAWINGS

Figure 1:
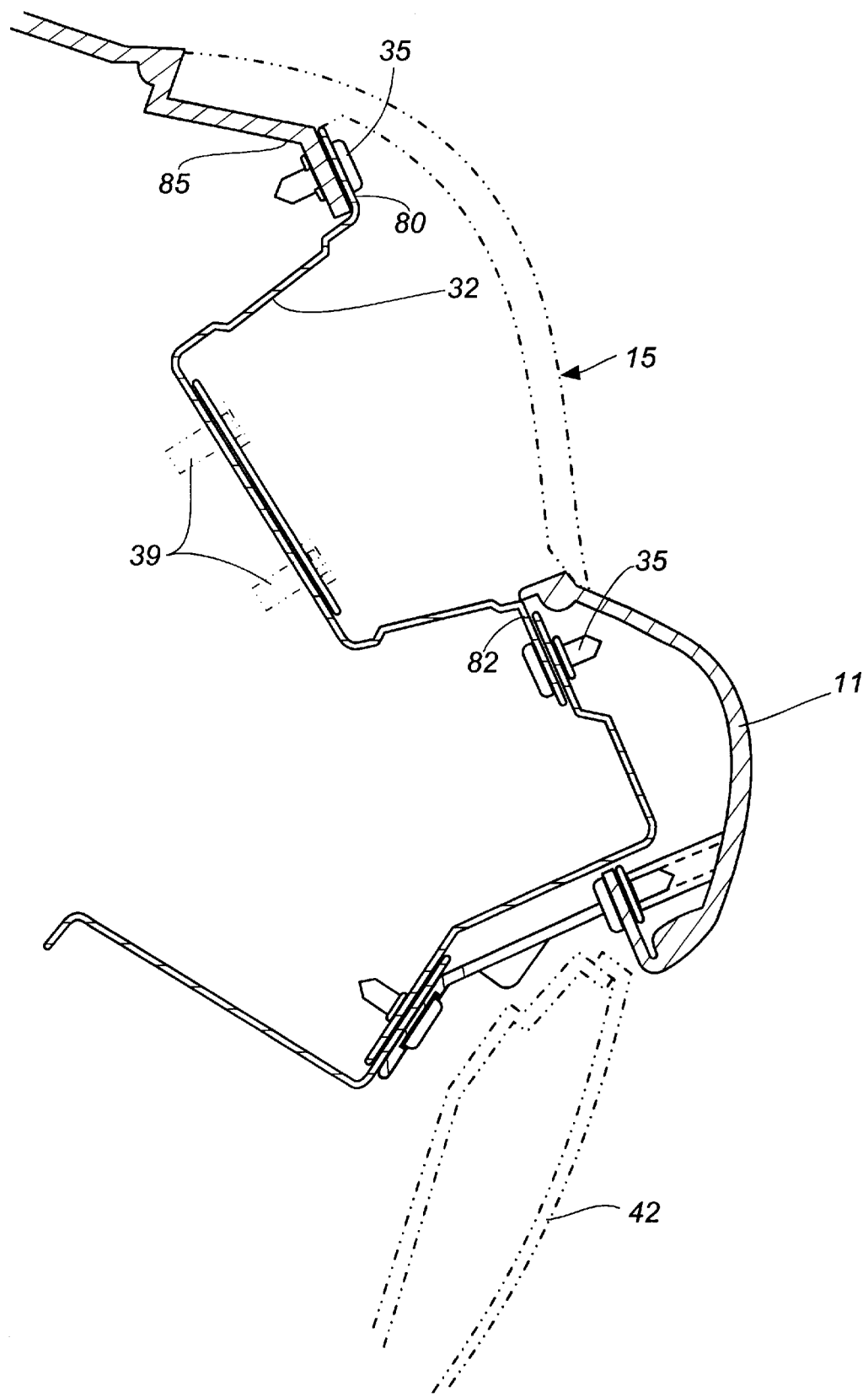
FIG. 1 is a partial cross-sectional view illustrating a portion an instrument panel.

The passenger side air bag apparatus of the present invention will be described in detail by means of embodiments shown in FIGS. 1 to 5.

In these drawings, 11 is an instrument panel to be secured to a vehicle body, having an underspace 13 capable of accommodating an air bag module body housing 12. The module housing 12 supports an inflator and air bag (both of which are not shown). An opening 14 (FIG. 4) for allowing expansion of the air bag toward the interior of the passenger compartment (under the effect of a gas from the inflator) is formed in the instrument panel 11, at a position corresponding to the general seated location of the passenger (i.e. the non-driver occupant).

An air bag lid or cover 15 (see FIGS. 1, 4, 5) closes. The structure of this air bag lid 15 is described below.

The air bag lid 15 is made of a resin, and the top surface 300 of this air bag lid 15 is formed to conform with the top or outer surface of the instrument panel 11. A plurality of ribs 16 for improving rigidity of the air bag lid 15 itself are formed on the rear surface 206 of the cover 15. A plurality of clip fittings 17 (see FIG. 2) extend away from the rear surface 206 and are arranged at predetermined intervals along an upper edge 200 of the rear 206 surface of the air bag cover or lid 15. Metallic clips 18 described later are secured to these clip fittings 17.

Further, on the rear of the air bag lid 15, a plurality of collars, fingers or tabs 19 extend above the rear surface 206 of the air bag cover in a direction generally perpendicular to the top edge 200 of the air bag lid 15. These collars 19 are formed in the proximity of the top edge 200 of the air bag lid 15 and are arranged at spaced intervals along the air bag lid 15. A plurality of engagement holes 20 are provided in the air bag lid 15. Further, a thin hinge 21 (see FIG. 4) is provided for permitting the air bag lid 15 to rotate thereabout upon expansion of the air bag. The hinge 21 is formed as an integral part of the cover 15 and generally located where the collars 19 intersect the rear of the air bag lid 15.

A fitting, flange or bracket 23 is integrally formed on the lower edge 202 of the air bag lid 15 and includes a breaking or tear seam portion 22 (see FIGS. 4 and 5B) formed by grooves 27 locally reducing the thickness of the cover 15. This fitting or bracket 23 is screwed to the back of the instrument panel 11 using screws 24. The instrument panel 11 includes screw inserting holes 25 (See FIG. 4) for receiving screws 24 at a plurality of points along the longitudinal direction of the fitting bracket 23.

The shape of the opening 14 formed in the instrument panel 11 will be described. Engagement recesses or shoulders 26 are formed on the upper edge and the both side edges of the opening 14 for closely receiving the upper edge 200 and both side edges 210a,b of the air bag lid 15. Further, screw holes 28 are formed on the back of the lower edge 74 of the opening 14 formed in the instrument panel 11 for mounting the bracket or fitting 23 of the air bag lid 15 via screws 24.

Figure 7:
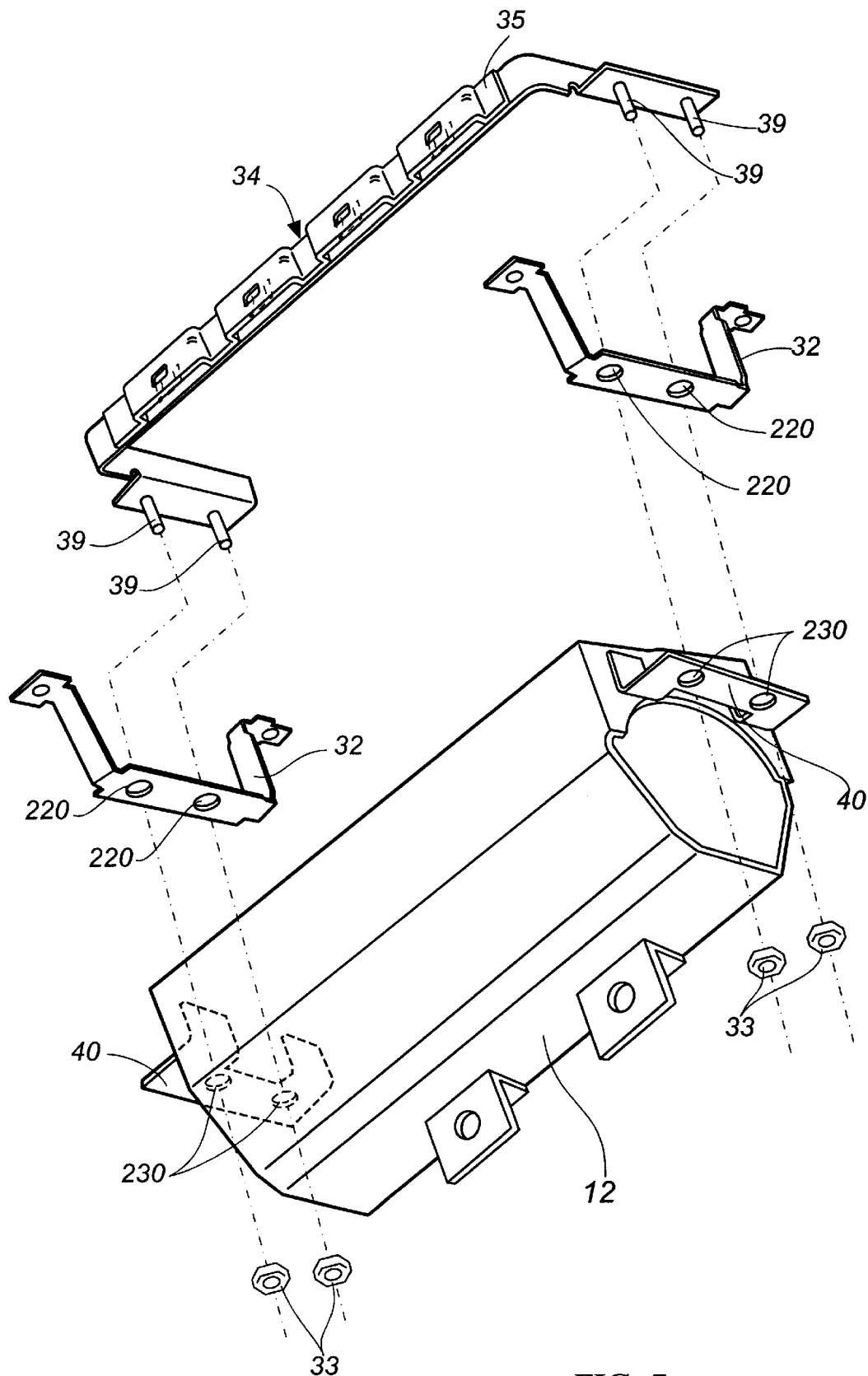
FIG. 7 is an assembly view of the present invention.

The structure for mounting the air bag module body 12 and the air bag lid 15 onto the instrument panel 11 will now be described. A pair of side panel brackets 32 (see FIGS. 4 and 7) are attached to the back of the instrument panel 11. Each panel bracket 32 is generally U-shaped and formed of a high-strength material such as a metal: the upper end 80 thereof is fixed to a front surface side portion 85 of the instrument panel 11, and the lower end 82 thereof (see FIG. 1) is attached to a back side of the instrument panel 11 by means of fitting screws 35 to both side edges of the opening 14 of the instrument panel 11. Only one bracket 32 is shown in FIG. 1, the other is shown in FIG. 7. Further, through-holes 220(see FIG. 7), for insertion of stud bolts 39 which are part of a lid bracket 34, are provided in each panel bracket 32.

Figure 3:
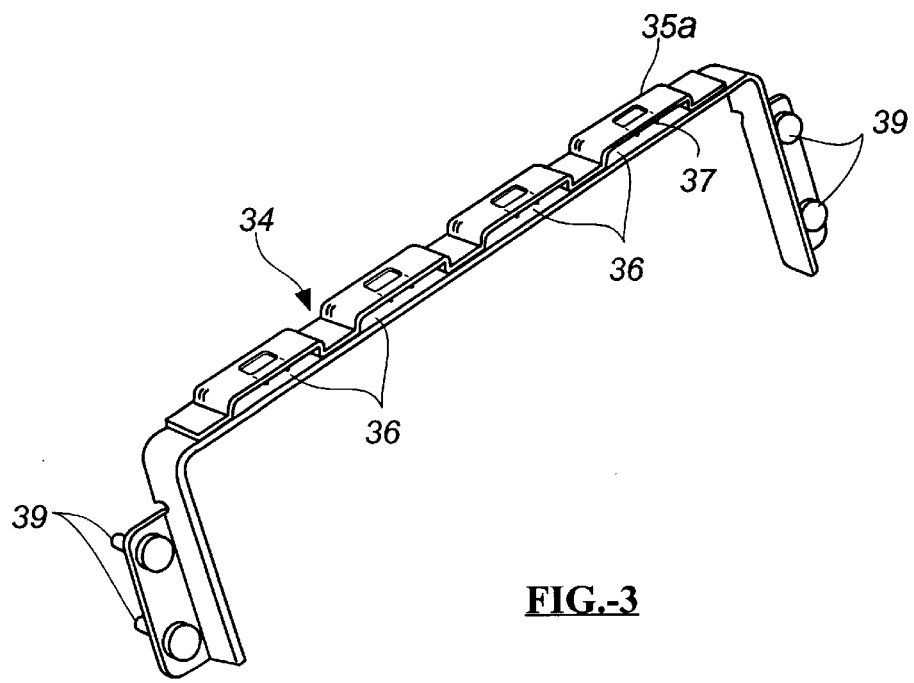
FIG. 3 is a perspective view of a lid bracket.
Figure 4:
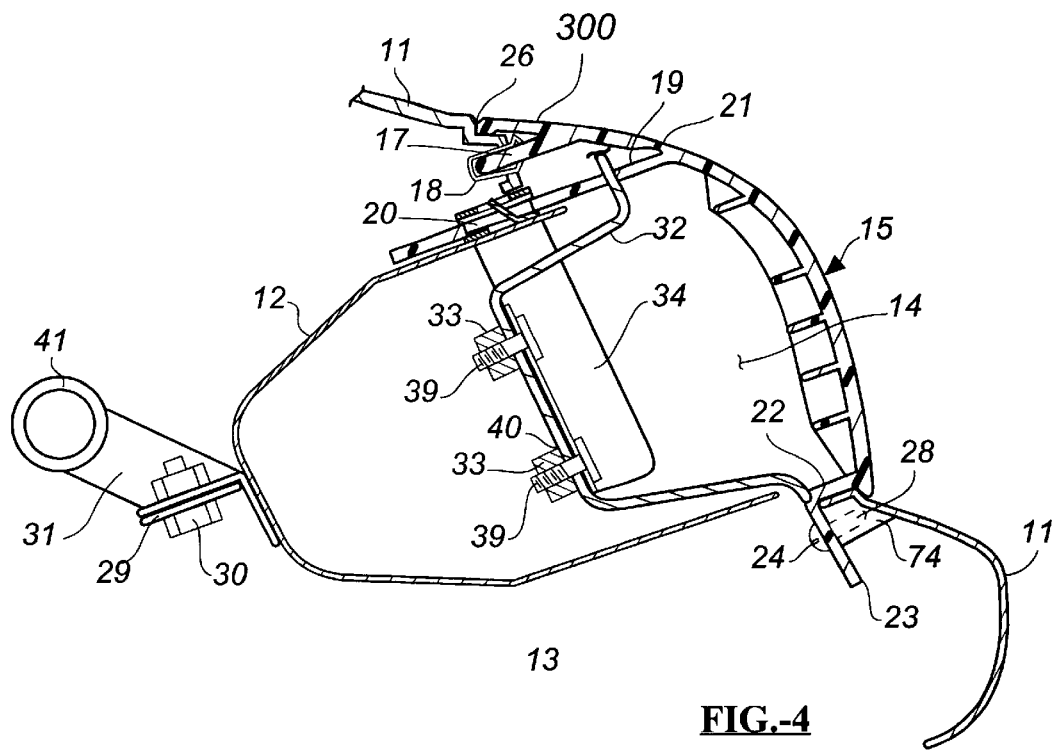
FIG. 4 shows a view of a completed air bag module constructed in accordance with the present invention.

A lid bracket 34 for mounting the air bag lid 15 onto the panel brackets 32 is assembled to the air bag lid 15. The lid bracket 34 is formed by a high-strength material such as a metal and is formed substantially in reverse U-shape as shown in FIG. 3. Both ends thereof have stud bolts 39 attached thereto, and a bent metal band 35 defining a plurality of insertion spaces 36 to receive a respective one of the plurality of collars 19 of the air bag lid 15 are formed in the upper portion thereof. The band 35 includes a plurality of setup claws 37 that extend into each space 36. The setup claws are received in the engagement holes 20 (see FIG. 2) formed in the collars 19 of the air bag lid 15 as shown in FIGS. 3 and 4.

Figure 2:
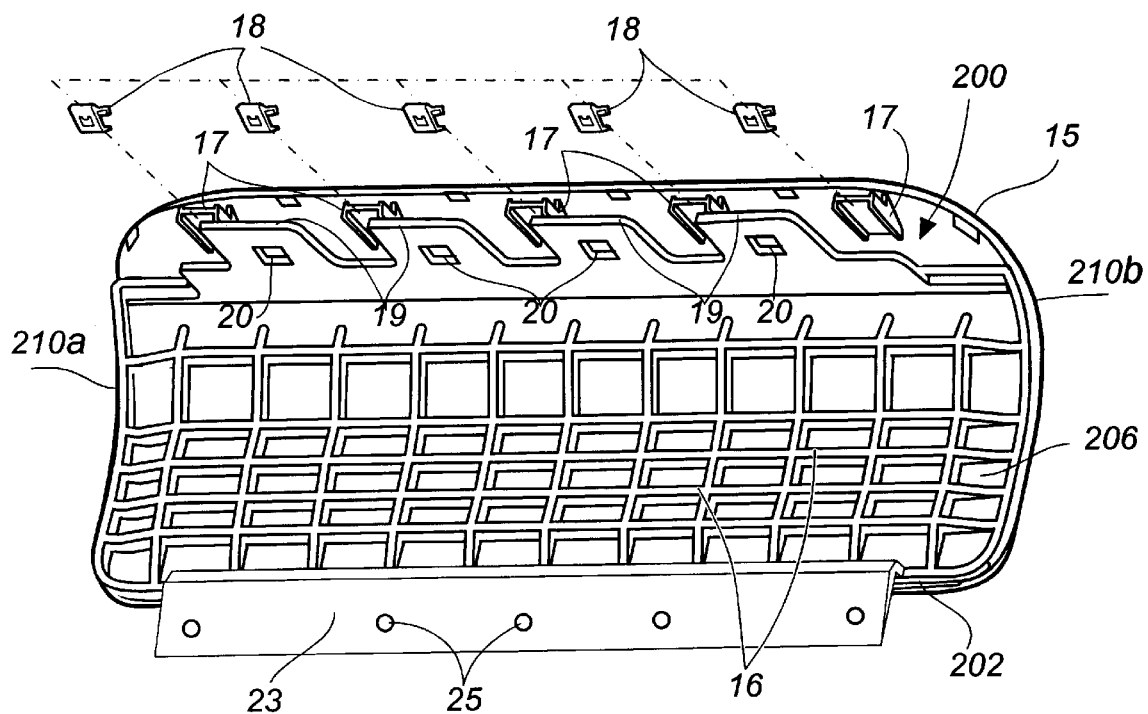
FIG. 2 is a rear perspective view of an air bag lid or cover.
Figure 5A:
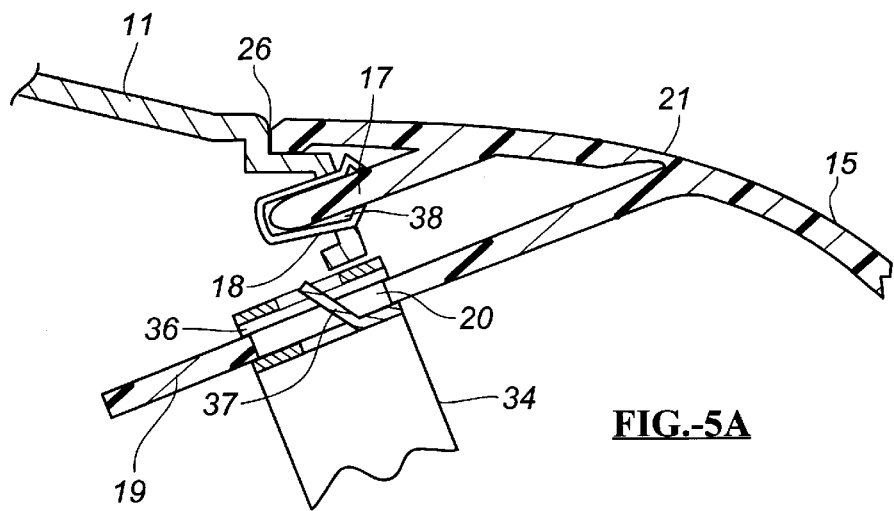
Figs. 5A and 5B are partially enlarged sectional views of the upper portion and the lower portion of FIG. 4.
Figure 5B:
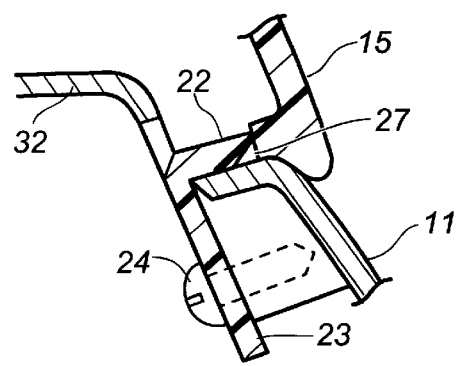
Figure 6:
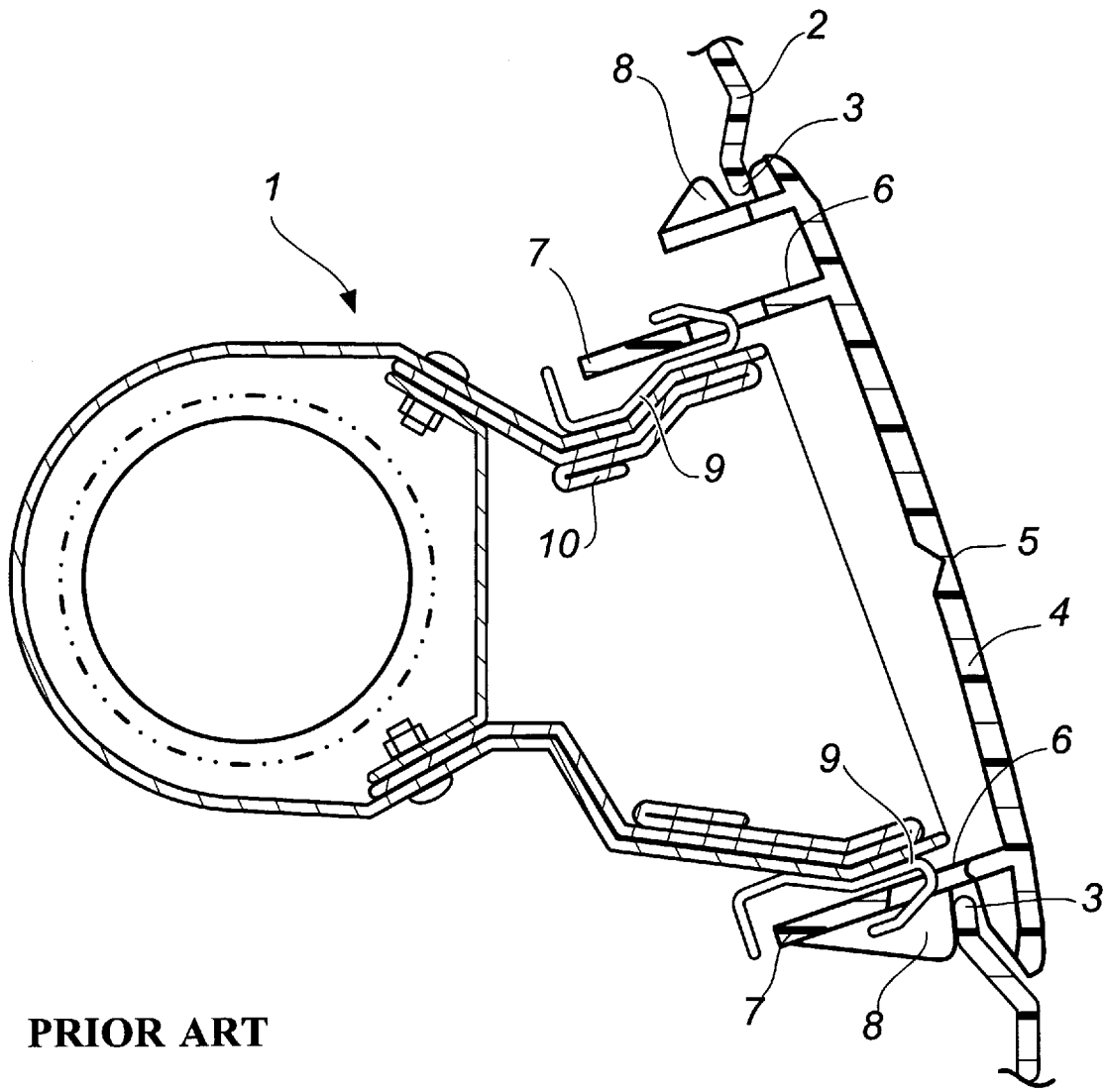
FIG. 6 illustrates a prior art air bag module.

As mentioned above, the metallic clips 18 are combined, as shown in FIG. 2, with the clip fittings 17 of the air bag lid 15 to hold the lid 15 in place. These clips 18 are engaged with clip engaging holes 38 pierced at certain intervals along the upper edge of the opening of the instrument panel 11, as shown in FIG. 5A, thereby assembling the upper portion of the air bag lid 15 with the upper edge of the opening 14 of the instrument panel 11 without a free-play.

The air bag module 10 having a housing or body 12 is attached from the back side of the instrument panel 11 to the panel bracket 32 of the instrument panel 11. Prior to attachment of the housing 12 an air bag and inflator are positioned within the housing 12. Module side brackets 40 are provided on both sides of the air bag module body 12. Each side bracket 40 includes two through-holes 230 to receive a respective stud bolt 39 which extends from and is part of the panel bracket 32. As can be seen in FIG. 7 the stud bolts 39 also extend through the openings 220 in each panel bracket 32. By driving a nut 33 onto the stud bolt 39 which passes through and projects from the through-hole of the module side bracket 40, the lid bracket 34 and the air bag module body 12 are tightened together with the panel bracket 32 in between. A module bracket 29 is attached to the bottom of the air bag module body 12, and this module bracket 29 is secured to a support bracket 31 which may be a part of a support member 41, under the instrument panel 11. Brackets 29 and 31 may be attached by means of a fastener such as a fitting screw, bolt or nut, generally shown as 30.

In FIG. 1, numeral 42 represents a lid of a glove box, and installation, and maintenance (such as re-tightening) of the air bag module body 12 can be carried out by opening this lid.

Now the method for assembling the air bag module comprising the air bag module body 12 and the air bag lid 15 into the instrument panel 11 will be described.

First, the side pair of panel brackets 32 are secured to the inside of the instrument panel 11 by screw-fitting the upper 80 and lower 82 ends thereof with fitting screws 35 inside the opening 14 of the instrument panel 11.

Then, the air bag lid 15 and the lid bracket 34 are connected together. The lid bracket 34 and the air bag lid 15 are connected together by inserting the individual collars 19 provided on the air bag lid 15 into the respective insertion spaces 36 provided in the lid brackets 34, then raising the setup claws 37 provided in the lid bracket 34 toward the insertion spaces 36, and pushing in the setup claws 37 into the respective engagement holes 20 provided in the individual collars 19, thereby mounting the lid bracket 34 onto the air bag lid 15.

The lid bracket 34 and the air bag module body 12 are tightened together with, and secured to, the panel brackets 32. The lid bracket 34 is inserted into the opening 14 from the back side of the instrument panel 11 and the stud bolts 39 (on the lid bracket 34) are inserted into holes 220 of the panel bracket 32 (which has already been attached to the instrument panel 11). The module side bracket 40 of the air bag module body 12 is moved to receive each stud bolt 39 and each nut 33 is screwed upon a respective stud bolt 39.

In this assembly operation, the clip 18 provided in the air bag lid 15 is engaged with the clip engaging hole 38 provided in the instrument panel 11. Further, the peripheral edge of the air bag lid 15 is secured to the engagement recess 26 in the opening 14 of the instrument panel 11. The fitting or bracket 23 end of the lid 15 is secured by the screws 24 to the inside the instrument panel 11.

Then, mounting of the air bag module body 12 and the air bag lid 15 is completed by securing the module bracket 29 provided on the back of the air bag module body 12 to a support bracket 31 fitting fasteners 30.

According to the present invention, as described above, which comprises an assembly process of subassembling the lid bracket 34 to the air bag lid 15 and another assembly process of mounting the lid bracket 34 attached with this air bag lid 15 onto the panel bracket 32 within the instrument panel 11, it is very easy to visually check the state of connection of the air bag lid 15 and the lid bracket 34 as a result of the subassembly, thus improving the accuracy of mounting of the air bag lid through prevention of erroneous mounting of the air bag lid 15 or a defective mounting thereof.

The steps of engagement of the air bag lid 15 and the lid bracket 34 comprise inserting the flat collars 19 provided on the air bag lid 15 into the insertion spaces 36 formed in the lid bracket 34, and then raising the setup claws 37, thereby connecting the air bag lid 15 and the lid bracket 34, and these steps are characterized by the elimination of the necessity for bolts and nuts or other fitting screws. When using, for example, bolts and nuts or other fitting screws, there is a risk that the opening provided in the instrument panel 11 may effectively become reduced depending upon the length of the bolt shaft. According to the present invention, however, in which bolts or other fitting screws are not employed as means for such engagement, it is possible to adopt a design with the largest possible area of the opening 14 to be provided in the instrument panel 11, and this makes it possible to equip the vehicle with an air bag of a desired size, and further to permit smooth and easy expansion of the air bag into the passenger compartment.

We claim:

1. An air bag apparatus for a vehicle comprising: an air bag module body housing, an air bag disposed below an underside of an instrument panel, said air bag inflating, upon detection of a crash of the vehicle thereby opening a tear seam portion of an air bag cover situated within an opening of said instrument panel, a lid bracket connected to said air bag cover, and panel brackets attached directly to the underside of said instrument panel, wherein said air bag cover is fixed, via said lid bracket, to said panel brackets after said air bag cover is inserted into the opening of said instrument panel from a top surface side thereof; and further, said air bag module body housing is secured to said panel brackets.

2. An air bag apparatus for a vehicle according to claim 1, wherein a plurality of collars extend from an underside of the cover, each collar having an engagement hole therein, and wherein said lid bracket defines a plurality of insertion spaces for insertion of a respective one of said collars, said lid bracket further including a plurality of setup claws for engagement in a respective one of said engagement holes of said collars.

3. An air bag apparatus for a vehicle comprising:
an instrument panel having a top surface, a cover receiving opening having a first edge and an opposite second edge;
a cover, and
a housing means for holding a portion of the cover;
the cover sized to fit within the opening including:
a top surface;
a first side having hinge means, below the top surface, for enabling the cover to rotate thereabout upon inflation of an air bag, and
an opposite second side including attachment means having a tearable portion which is torn apart by the inflating air bag enabling the cover to rotate about the hinge means;
the first side including:
a first set of tabs (17) extending from an underside of the cover, each tab received within a corresponding clip (18) that is fit into and adjacent one edge of the instrument panel opening for permitting the top surfaces of the cover and of the instrument panel to be aligned to each other independent of any interconnection between the cover and the housing means.

4. The apparatus as defined in claim 3 wherein the cover includes a plurality of projections (19) extending from the underside of the cover and located inboard of the first set of tabs (17), a top portion of each projection proximate the underside of the cover forming the hinge means; and wherein the housing means is secured at a location within the vehicle remote from the instrument panel including bracket means for loosely securing each of the plurality of projections.

5. The apparatus as defined in claim 3 wherein the housing means includes a cavity for receiving an air bag inflator and an air bag.

6. The apparatus as defined in claim 4 wherein the housing means includes a housing (12) and further includes a reinforcing bracket (34) having a plurality of pockets (36) wherein each of the plurality of projections is lockingly received into each one of the pockets.

7. The apparatus as defined in claim 6 wherein the projections include a feature opening and wherein the bracket includes a locking feature received within a corresponding feature opening.

8. The apparatus as defined in claim 7 wherein the bracket is a three sided bracket supporting the side wall of the housing and two opposing housing ends.

9. An air bag apparatus for a vehicle comprising:
an instrument panel having a top surface, a cover receiving opening having a first edge and an opposite second edge;
a cover, and
housing means for holding a portion of the cover;
the cover sized to fit within the opening including:
a top surface;
a first side having hinge means, below the top surface, for enabling the cover to rotate thereabout upon inflation of an air bag, and
an opposite second side including attachment means having a tearable portion which is torn apart by the inflating air bag enabling the cover to rotate about the hinge means;
the first side including:
a first set of tabs (17) extending from an underside of the cover, each tab received within a tab opening in the instrument panel and loosely secured thereto by a corresponding clip (18) operatively connected to a corresponding tab for permitting the top surfaces of the cover and of the instrument panel to be aligned to each other independent of any interconnection between the cover and the housing means and
the housing means including bracket means for loosely securing a portion of the hinge means thereto.

10. The apparatus as defined in claim 9 wherein the hinge means includes a plurality of projections (19) extending from the underside of the cover and located inboard of the first set of tabs (17), a top portion of each projection proximate the underside of the cover forming a hinge.

11. The apparatus as defined in claim 10 wherein the housing means includes a housing (12) and a reinforcing bracket (34) having a plurality of slots (36) wherein each of the plurality of projections is loosely received into one of the slots to permit a limited degree of movement generally perpendicular to a plane through each slot.

12. The apparatus as defined in claim 9 wherein the housing means includes a cavity for receiving an air bag inflator and an air bag.

13. The apparatus as defined in claim 9 wherein each clip and tab opening cooperate to permit the cover to float therein.

14. The apparatus as defined in claim 9 wherein each clip and tab opening cooperate to limit the depth of insertion of each tab into a cooperating tab opening.

* * * * *